Figure 1:
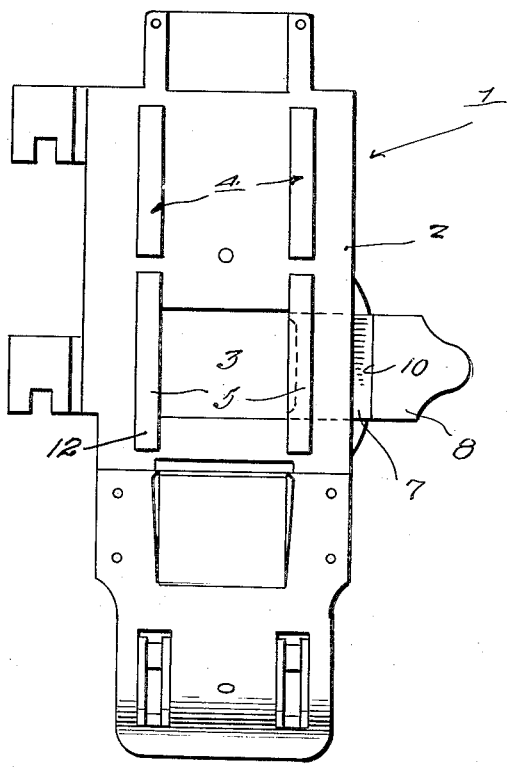

March 10, 1931.                B. A. CAWTHON ET AL                1,795,999
                                  FILM TRAPDOOR
                               Filed Aug. 27, 1928              3 Sheets—Sheet 1

Inventors
B. A. Cawthon
Antonio Altieri

By  Clarence A. O'Brien
                        Attorney

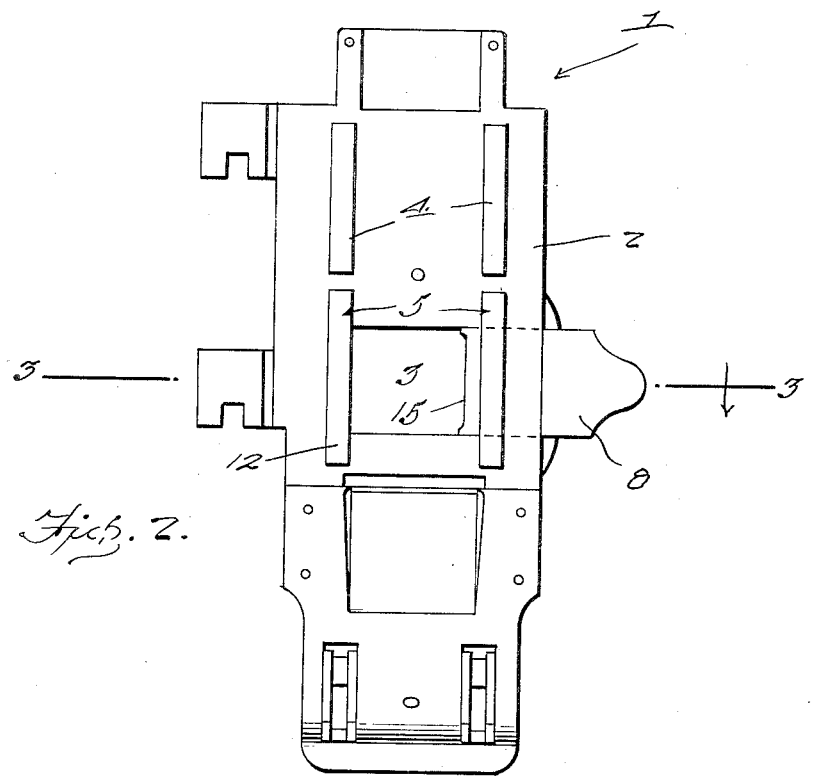
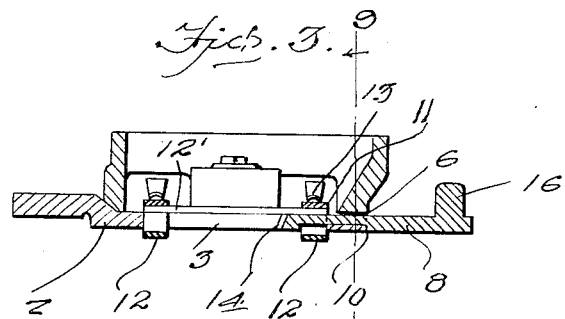

March 10, 1931.  B. A. CAWTHON ET AL  1,795,999
FILM TRAPDOOR
Filed Aug. 27, 1928  3 Sheets-Sheet 3
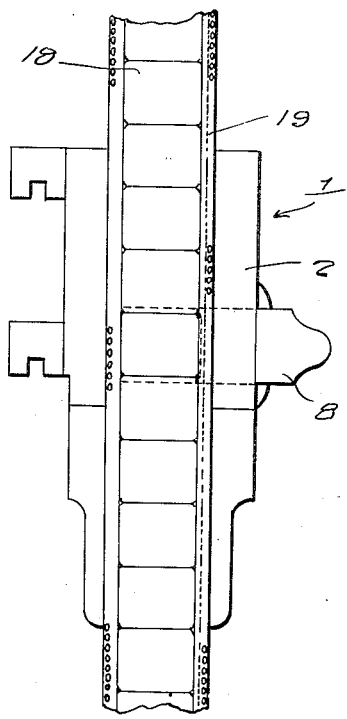
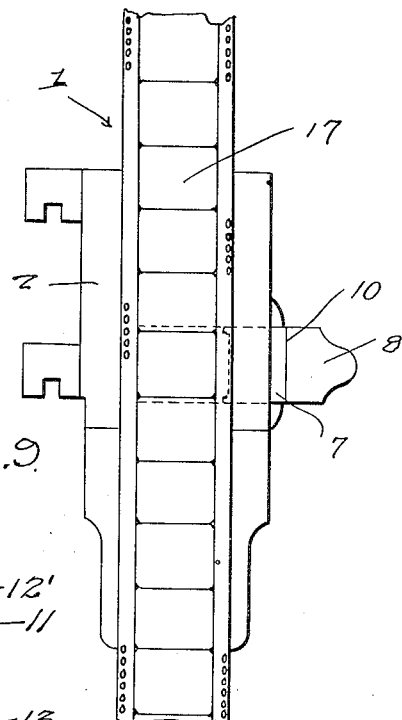
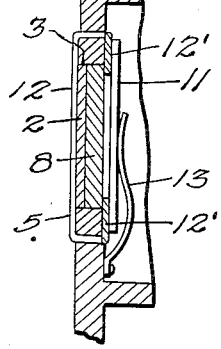
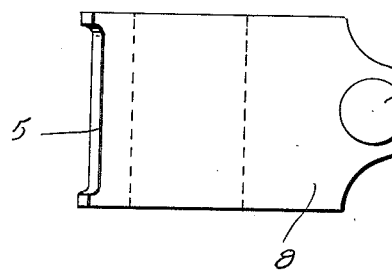
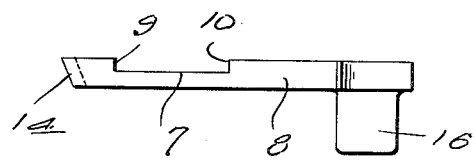
Inventors
B. A. Cawthon
Antonio Altieri
By Clarence A O'Brien
Attorney Patented Mar. 10, 1931

1,795,999

UNITED STATES PATENT OFFICE

BENDER A. CAWTHON AND ANTONIO ALTIERI, OF JACKSONVILLE, FLORIDA, ASSIGNORS OF ONE-THIRD TO JESSE L. CLARK, OF JACKSONVILLE, FLORIDA

FILM TRAPDOOR

Application filed August 27, 1928. Serial No. 302,347.

The present invention relates to improvements to attachments for moving picture machines and particularly to that part known as the film trap door.

One of the primary objects of the present invention is to provide a film trap door which is provided with means for using a single film trap door in projecting standard films provided with a plurality of rows of pictures or films having sound tracks along the marginal edges thereof, additional means being associated with the door for masking out the sound tracks during the projection of the films having sound tracks along their marginal edges.

At the present time, considerable time and labor is expended in changing over the film trap door when a standard film and a film having a sound track are successively placed in the moving picture machine for projection purposes and frequently the operator will forget to interchange the film trap doors or else neglect to mask out the sound track when a film provided with a sound track along its marginal edge is in the machine and as a result, the sound track as well as the pictures will be projected on the screen to view of the audience.

It is therefore one of the principal objects of the present invention to provide a film trap door which includes a sliding mask that when in one position will mask out the sound track of certain types of films that are being projected on the screen by the moving picture machine. and when the slidable mask is in another position, standard films that are not formed with sound tracks may be properly displayed or projected on the screen.

Still a further object is to provide a film trap door that includes a particular film shoe engaging unit, the tensioning springs that are commonly in engagement with the shoe being maintained out of engagement with the slidable sound track mask.

A further object is to provide a film trap door wherein the sound track mask can be readily and easily inserted in the door without necessitating any material alterations. the slidable mask being at all times positive and efficient in its operation and being at all times accessible to the operator.

A further object is to provide a film trap door of the above mentioned character which is simple in construction, inexpensive, strong and durable and further well adapted to the purpose for which it is designed.

Other objects and advantages will become apparent during the course of the following description.

Figure 6:
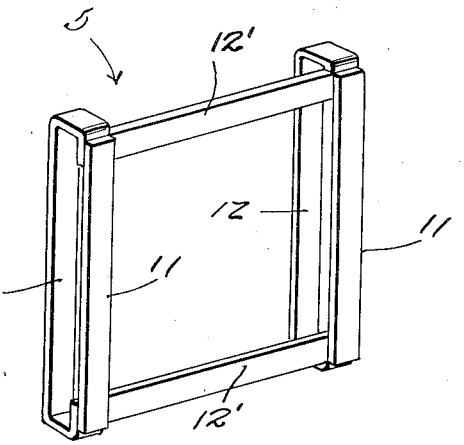

In the accompanying drawings forming a part of this specification, and in which like numerals indicate like parts throughout the same:

Figure 1 is an elevation view of the film trap door embodying my invention showing the slidable sound track mask in its outermost position, Figure 2 is a view similar to Figure 1 showing the sound track mask moved inwardly for masking out the sound track of a particular type of film, Figure 3 is a cross sectional view taken approximately on the line 3—3 of Figure 2 looking downwardly, Figure 4 is an elevational view of the slidable sound track mask per se, Figure 5 is an edge elevation thereof, Figure 6 is a detail perspective view of the improved shoe unit forming a salient part of the present invention, Figure 7 is a view diagrammatically illustrating the manner in which the mask covers the sound track of a film that is adapted to travel over the face of the film trap door, and Figure 8 is a view similar to Figure 7 showing the slidable mask with relation to a standard film that is adapted to travel over the face of the film trap door.

Figure 9 is a fragmentary vertical transverse sectional view taken substantially on the line 9—9 of Figure 3.

In the drawings wherein for the purpose of illustration is shown the preferred embodiment of our invention, the numeral 1 designates generally a film trap door, the same comprising a plate like body 2 and is adapted to be positioned adjacent the conventional aperture plate in a moving picture machine in the usual manner and as the manner of mounting the film trap door is well known in the art and as the same forms no important part of the present invention, a detail description thereof is thought unnecessary in the present instance.

The plate like body is formed with a substantially rectangular shaped opening 3 through which the light from the lamp house projects and across which opening is adapted to travel a film provided with a series or rows of pictures.

For the purpose of properly positioning the film against the aperture plate, said film trap door is provided with the upper and lower film engaging shoes denoted generally by the reference characters 4 and 5 respectively and conventional leaf springs are employed to urge these shoes through appropriate openings therefor formed in the plate like body 2 of the film trap door against the marginal edges of the film strip in the manner also well known in the art.

At the present time certain types of films are provided with sound tracks along their marginal edges for use in conjunction with a moving picture machine whereby sound is produced in synchronization with the projection of the film upon the screen. However in order to use the same moving picture machine to project standard type of films, it is necessary to employ a mask to mask out the sound tracks when a film having the sound track along its marginal edge is in the machine so that said sound track will not be projected upon the screen.

Various devices have been devised for masking out the sound track but insofar as we are able to ascertain, nothing has been devised for association with the film trap door for masking out the sound track of certain films.

It is therefore one of the principal aims of our invention to provide a simplified mask for association with the film trap door and to this end, the plate like body 2 is slit as at 6 along one of its side edges and directly in communication with the opening 3 and operable within this slit is the channeled portion 7 of the substantially rectangular shaped masking plate 8.

The shoulders 9 and 10 formed by the channeled portion 7 provide a certain function that is to be presently described and it will be observed that the channeled portion 7 is of a width greater than the distance between the side edge of the plate like body 2 and the adjacent edge of the opening 3.

The lowermost shoe unit 5 has the strips 11 bridging the upper and lower ends of the angularly disposed ends of the film engaging portions of the shoe, said film engaging portions being denoted by the reference character 12 and portion of the slidable mask 8 is operable between the adjacent pair of strip like portions 11 and 12 as clearly illustrated in Figure 3. The purpose of the strips 11 is to maintain the leaf springs 13 out of engagement with the masking plate 8 and this is also clearly illustrated in Figure 3.

Cross strips 12' connect the angularly disposed ends of the upper and lower portions of the lower shoe as is shown to advantage in Figure 6.

The inner end of the plate 8 is beveled as shown at 14 and furthermore the inner end of the plate is cut out as at 15, the cut out portion extending from points inwardly of the upper and lower edges respectively of said plates as clearly shown in Figure 4.

The outer end portion of the masking plate 8 is reduced and extending laterally from the reduced portion is the actuating knob 16 which knob provides means for facilitating the inward and outward sliding movement of the mask as will be hereinafter more fully described.

When the film trap door is equipped with the masking plate 8 and the masking plate is moved to its outermost position so that a substantially oblong shaped opening is formed in the plate like body 2, a standard film may be run through the moving picture machine and the rows of pictures 17 will be caused to pass over the opening 3 and the inner edge of the masking plate will be positioned in the manner as shown in Figures 1 and 8 and the shoulder 9 will engage with the adjacent edge of the opening 3.

When it is desired to use the same film trap door in projecting a film having a sound track along one of its marginal edges, it is only necessary for the operator to grasp the knob 16 and push the masking plate 8 inwardly through the slot provided therefor in the plate like body 2 so that the inner edge portion of the plate will extend into the opening 3 and the shoulder 10 will abut the outer side edge of the plate like body in the manner as shown in Figures 2 and 7 and then a square opening will be formed to accommodate similar shaped rows of pictures 18 and the sound track 19 formed along one marginal edge of this particular type of film will be covered by the inwardly projecting portion of the plate 8 so that only the picture will be projected on the screen and the sound track will be completely masked out.

The corners of the cut out portion 15 are slightly rounded to coincide with the rounded corners of the rows of pictures 18 while the purpose of the beveled face 14 is to permit the proper projection of the light rays through the opening 3 in order to project the picture upon the screen, and to further provide for the proper focusing of the adjacent edge portion or side of the film.

The provision of a film trap door of the above mentioned character will obviate the necessity of the operator having to entirely remove the film trap door and interchange the same with a specially equipped film trap door when using one machine to project standard films and other films are provided with sound tracks.

Furthermore the simplicity of our improved masking plate enables the same to be readily and easily actuated for changing over from a standard film to a film formed with a sound track as the occasion demands.

A masking plate of the above mentioned character will at all times be efficient and reliable in carrying out the purposes for which it is designed and furthermore the same can be readily and easily associated with a film trap door without necessitating any material alterations of the door.

Furthermore, the masking plate will not come in contact with the film thereby preventing any possibility of the masking device scratching or otherwise defacing the rows of pictures on the film.

While we have shown the preferred embodiment of our invention, it is to be understood that various changes in the size, shape and arrangement of parts may be resorted to without departing from the spirit of the invention and the scope of the appended claims.

Having thus described our invention, what we claim as new is:

1. In combination with a film trap door provided with an opening over which a standard film or a film provided with a sound track along its marginal edge is adapted to pass, a spring pressed film engaging shoe including spaced bars for disposition adjacent the ends of the opening; of a plate slidably mounted in one side of the film trap door, the inner end portion of the plate adapted to project within the opening and adapted to mask out the sound track when a film of the last mentioned character is employed, the inner end portion of the plate extending beyond the inner edge of the adjacent bar of the shoe when said plate is in its innermost position, said inner end portion of the slidable plate being disposed outwardly of the inner edge of the adjacent bar of the shoe when the plate is moved outwardly of the film trap door when a standard film is employed.

2. In combination with a film trap door provided with an opening over which a standard film or a film provided with a sound track along its marginal edge is adapted to pass, a film engaging shoe including spaced bars for disposition adjacent the ends of the opening; of a plate slidably mounted in one side of the film trap door, the inner end portion of the plate adapted to project within the opening and adapted to mask out the sound track when a film of the last mentioned character is employed, the inner end portion of the plate extending beyond the inner edge of the adjacent bar of the shoe when said plate is in its innermost position, said inner end portion of the slidable plate being disposed outwardly of the inner edge of the adjacent bar of the shoe when the plate is moved outwardly of the film trap door when a standard film is employed, resilient means for exerting an outward pressure upon the bars of the shoe, and additional means for maintaining said resilient means out of engagement with the slidable masking plate.

3. In combination with a film trap door provided with an opening, over which a standard film, or a film provided with a sound track along its marginal edge is adapted to pass, a film engaging shoe including spaced bars for disposition adjacent the ends of the opening, of a plate slidably mounted on one side of the film trap door, the inner end portion of the plate adapted to project within the opening to mask out the sound track when a film of the last mentioned character is employed, the inner end portion of the plate extending beyond the inner edge of the adjacent bar of the shoe when said plate is in its innermost position, said inner end portion of the slidable plate being disposed outwardly of the inner edge of the adjacent bar of the shoe when the plate is moved outwardly of the film trap door, when a standard film is employed, said plate provided with a groove for accommodating a portion of the door between one edge of the trap door, and an adjacent end of the opening, the walls of said groove constituting stop shoulders, one of which is adapted to contact said one edge of said trap door when said mask plate is in said innermost position, and the other of which shoulders is adapted to engage said trap door at said adjacent end of said opening, when said plate has the inner end portion thereof disposed outwardly of the inner edge of the adjacent bar of the shoe.

4. In combination with a film trap door provided with an opening, over which a standard film, or a film provided with a sound track along its marginal edge is adapted to pass, a film engaging shoe including spaced bars for disposition adjacent the ends of the opening, of a plate slidably mounted on one side of the film trap door, the inner end portion of the plate adapted to project within the opening to mask out the sound track when a film of the last mentioned character is employed, the inner end portion of the plate extending beyond the inner edge of the adjacent bar of the shoe when said plate is in its innermost position, said inner end portion of the slidable plate being disposed outwardly of the inner edge of the adjacent bar of the shoe when the plate is moved outwardly of the film trap door, when a standard film is employed, said plate provided with a groove for accommodating a portion of the door between one edge of the trap door, and an adjacent end of the opening, the walls of said groove constituting stop shoulders, one of which is adapted to contact said one edge of said trap door when said mask plate is in said innermost position, and the other of which shoulders is adapted to engage said trap door at said adjacent end of said opening, when said plate has the inner end portion thereof disposed outwardly of the inner edge of the adjacent bar of the shoe, said plate at one end thereof being notched, said plate at said notched end being bevelled.

In testimony whereof we affix our signatures.

BENDER A. CAWTHON.
ANTONIO ALTIERI.